May 24, 1966  F. L. HILL ETAL  3,252,464
TOMATO SEPARATOR FOR HARVESTER
Original Filed Oct. 31, 1961  4 Sheets-Sheet 3
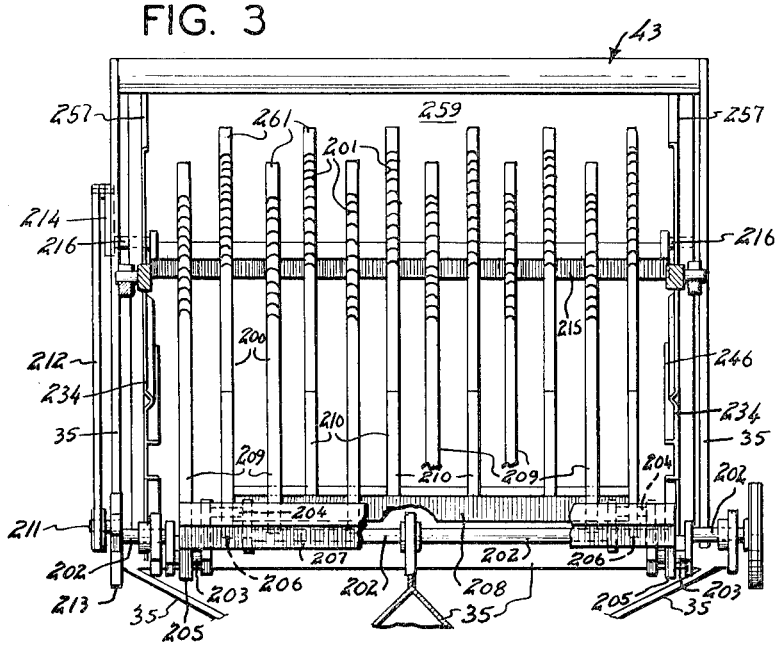
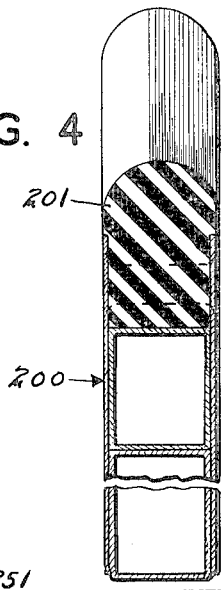
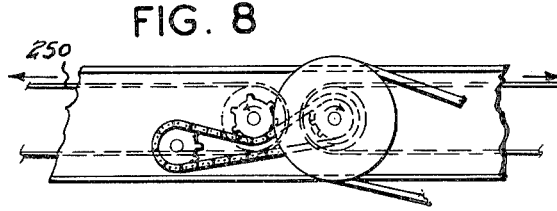
INVENTORS
FREDRICK L. HILL
LAUREN W. GATES
BY
Owen, Wickersham & Erickson
ATTY.

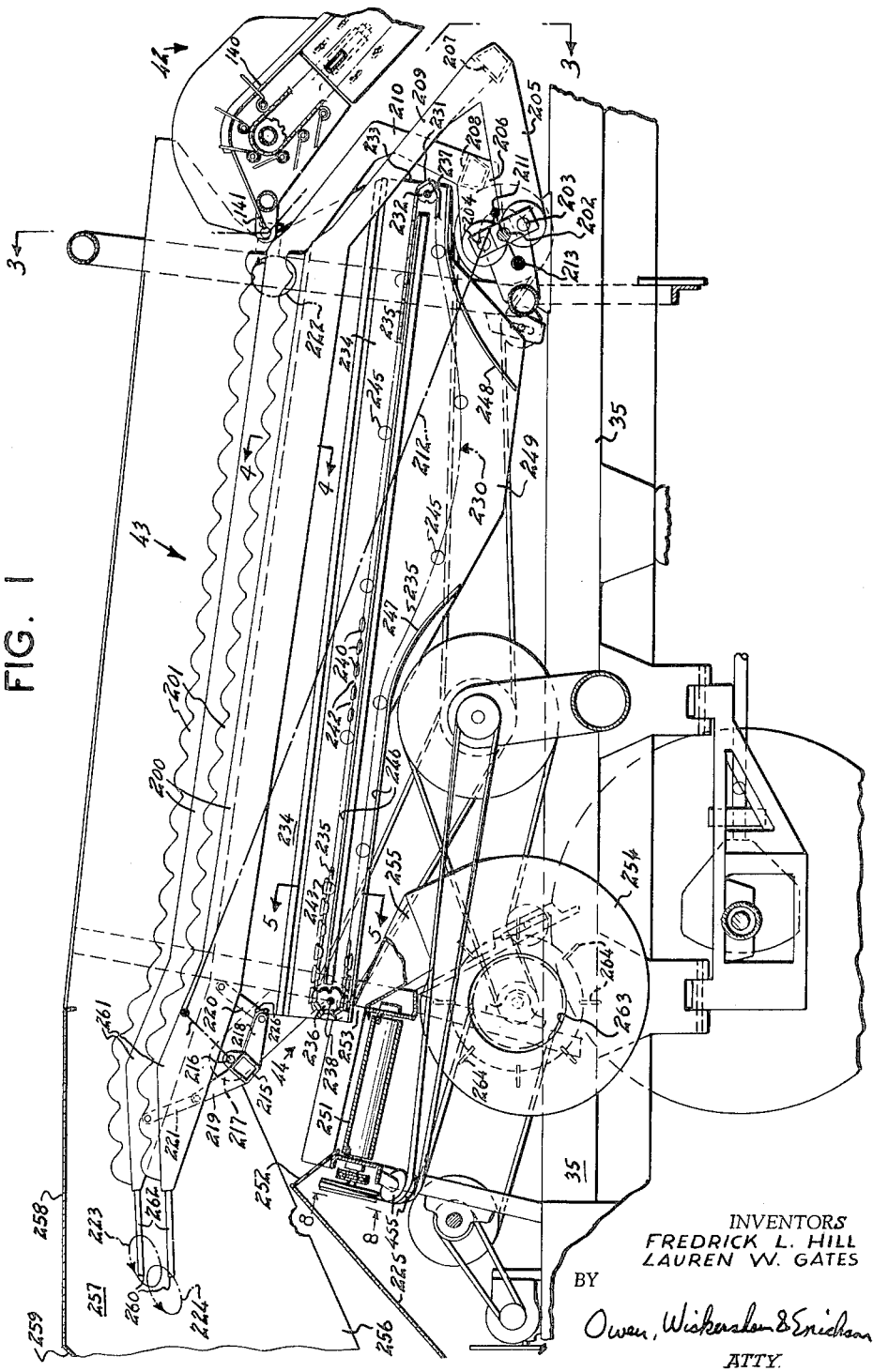

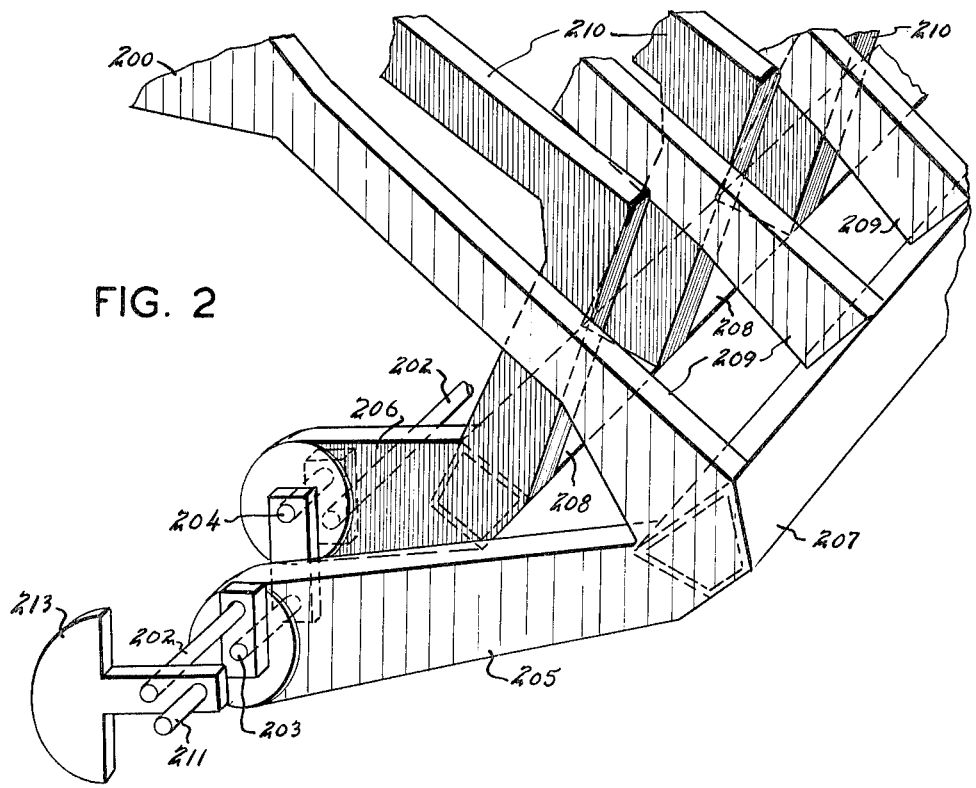

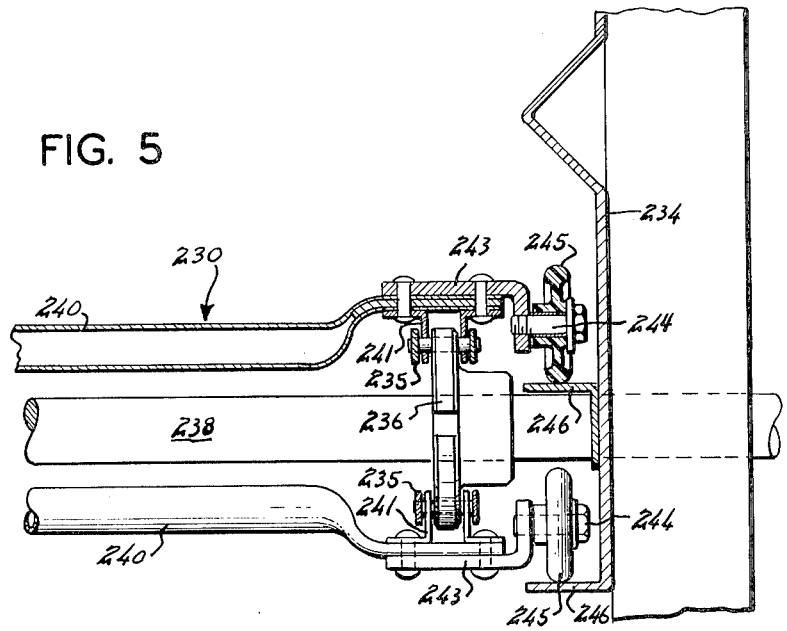
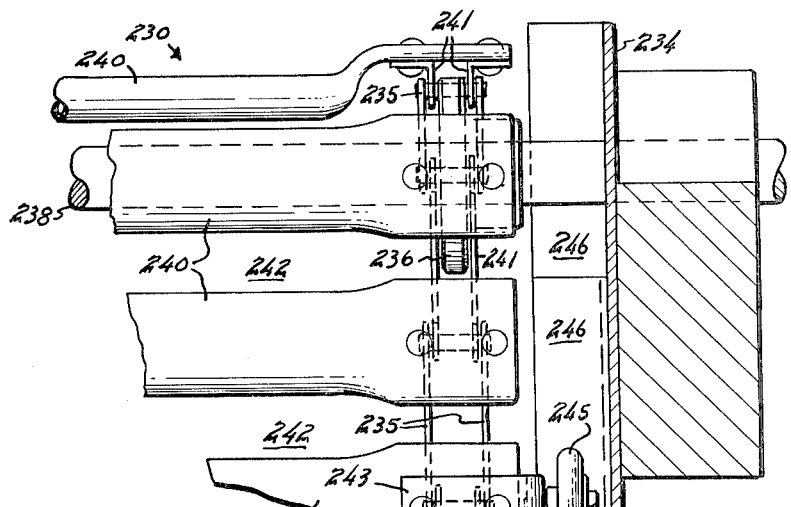
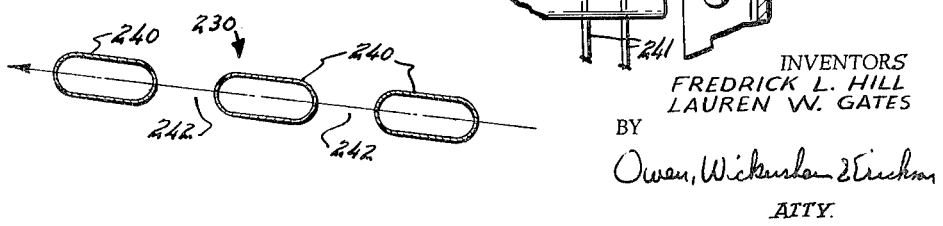

United States Patent Office 3,252,464
Patented May 24, 1966

3,252,464
TOMATO SEPARATOR FOR HARVESTER
Fredrick L. Hill, Rio Vista, and Lauren W. Gates, Lodi, Calif., assignors to The Regents of the University of California, Berkeley, Calif.
Original application Oct. 31, 1961, Ser. No. 148,963. Divided and this application Sept. 2, 1964, Ser. No. 398,825
10 Claims. (Cl. 130—30)

This invention relates to improvements in tomato harvesters and is a division of application Serial No. 148,963 filed October 31, 1961. More particularly it relates to improvements in harvesters like that shown in U.S. patent application Serial No. 59,031, filed September 28, 1960, by Lorenzen, Szluka, and Hill, now U.S. Patent No. 3,199,604. Still more particularly the invention relates to an improved device for separating tomatoes from tomato plants.

The present invention follows the basic teaching of Patent No. 3,199,604 in that it relates to a harvester which mechanically takes the whole vine up from the field and shakes the tomatoes off, separates the tomatoes from the leaves, dirt, and other matter, and provides for the sorting of the tomatoes and their loading into bins. Also like the invention disclosed in that application, in the present machine is used with a harvester which (a) a cutting device cuts the vine's main stem, preferably at root level; (b) a pickup device gently elevates the vine to a shaking device; (c) at the shaking device, rubber-covered walking bars mounted in two contrary-moving sets agitate the vine and advance it along the bars, while providing a gradually increasing shaking force as the vine moves from one end of the shaker to the other; (d) the vine is carried to the end of the shaking device and falls to the ground through an open chute; (e) the tomatoes removed by the shaker fall directly onto a conveyor, which carries them rearwardly; (f) certain devices remove dirt, leaves, and trash from the harvested tomatoes; (g) the tomatoes are cross-conveyed to sorting belts; (h) the tomatoes are visually sorted by hand as the sorting belts move them; (i) the sorted tomatoes are conveyed into containers, preferably located on a trailer being pulled parallel to the harvester; and (j) the tomatoes are then hauled away by trucks.

As stated earlier, the shaker uses two series of oppositely phased walking bars. In the prior device these bars were mounted on two crankshafts, but there was trouble because the tomatoes falling onto the crankshafts were being damaged beyond use and built up troublesome deposits on the crankshaft. The present invention has solved this problem by a novel mounting for the bars in which the space between the bars is completely unencumbered, free of all obstructions. The result is that far fewer tomatoes are damaged.

There was also a problem with vines wrapping themselves onto parts of the shaker and plugging the device, and the invention solves this problem by a novel arrangement, location, and combination of parts, which prevents vine accumulation.

The form of the walking bars themselves has been changed, too. It was discovered that finger-like projections on the bars were too quickly worn away and that they tended to damage the tomatoes. Plain bars will not advance the vines properly. The invention solves the problem by providing the bars with undulating wide upper surfaces that advance the vines without damage to the tomatoes and with considerably less wear on the bar surfaces.

Leaves, dirt and debris were always problems in previous tomato harvesting. In this invention the conveyor that catches the tomatoes that fall through the shaker also has a structure that gets rid of most of the dirt and some debris, while a novel combination of blowers, the shaker, and certain conveyors, enables the device to clean out an astonishing amount of debris from the fruit, and improved novel transfer structures enable elimination of more of this material during transfer from the collecting conveyor to some cross conveyors.

Other objects and advantages of the invention will appear from the following detailed description of a preferred embodiment of the invention.

In the drawings:

FIG. 1 is a fragmentary view in side elevation and partly in section of the shaker unit and adjacent portions of the machine.

FIG. 2 is a simplified fragmentary view in perspective of the forward portion of the shaker unit.

FIG. 3 is a view in vertical section taken along the line 3—3 in FIG. 1, showing the walking bars and their crankshaft, with some parts broken away to show other parts better.

FIG. 4 is a view in section of a walking bar taken along the line 4—4 in FIG. 1.

FIG. 5 is a fragmentary view in section taken along the line 5—5 in FIG. 1, showing the conveyor onto which the shaker unit shakes the tomatoes.

FIG. 6 is a plan view of the elements of FIG. 5.

FIG. 7 is a side elevation diagram of the conveyor of FIGS. 5 and 6, with a dot-dash line indicating the tilt of the conveyor.

FIG. 8 is a fragmentary view in rear elevation taken along the line 8—8 in FIG. 1, showing the drive for the cross conveyors at the rear of the shaker unit.

The shaker 43 includes a plurality of vertical parallel walking bars 200 with an upwardly extending undulating resilient upper surface 201. The bars 200 are made to produce a walking action by a crankshaft 202 at their forward end. The crankshaft 202 has a pair of diametrically opposite crank pins 203 and 204. The pins 203 and 204 are at the forward end of the shaker 43, and have respective forwardly extending arms 205 and 206. The two arms 205 from the pins 203 are joined by a rigid base bar 207, and the two arms 206 are joined by a second base bar 208, the arms 205 and 206 being of different lengths so that the base bars 207 and 208 never touch during operation. The base bars 207 and 208 lie beyond the front end of the shaker 43 and beneath the elevator 42 at a position never reached by tomatoes, as will be seen. Every other walking bar 200 is joined to the base bar by a connecting web 209 while the remaining (alternate) walking bars 200 are joined by a web 210 to the base bar 208.

There is also, on the right-hand side of the machine, a crank 211 lying at right angles to the crank for the pins 203 and 204 and of the same length, and to this is pivotally secured a long pitman 212. A counterweight 213 for the shaft 202 has its center of gravity directly opposite the pitman pivot at the same distance from the crankshaft 202. The pitman 212 extends to nearly the rear end of the shaker 43 and is there joined pivotally to a crank arm 214. The crank arm 214 is rigidly joined to a box beam 215, which is pivotally supported by pivots 216 on extensions 217 of the main frame 35. Along its length the beam 215 has arms 218 and 219, which alternate, each arm 218 extending forwardly and being connected to an arm 200 by a link 220, while each arm 219 extends rearwardly and is connected to an arm 200 by a link 221. The arms 200 that are joined to the base beam 207 are connected to the arms 218 while the arms 200 that are joined to the base beam 208 are connected to the arms 219.

Thus, the single crankshaft 202 operates the entire walking operation of all the bars 200 and walks them in alternate pairs. The base beams 207 and 208 follow essentially circular paths and cause a point on the forward end of each bar 200 to follow a path like that shown in the curve 222. The pitman 212 causes the box beam 215 to rock back and forth and the combination of the pitman 212 and the connections to the bars 200 cause a point at the rear of a bar 200 to follow a path like those in the curves 223 and 224 in FIG. 1. The result is a shaking action that bounces the vines and shakes the tomatoes off the vine. The undulating surface 201 causes the vine to walk up the bars 200 until at their upper end the tomato-less vine falls down a slide 225 at the rear of the machine and drops on the ground. Although the walker-base-beam interconnection system translates on generally circular paths, these are adjustable, to enable more or less vertical amplitude at the rockshaft than at the crankshaft. The rear ends of the walkers may thus be made to describe slightly elliptical paths in which the major axis may lie in the line from the point in question to the crankshaft or may be at 90° thereto, depending upon whether the amplitude at 90° to that line (the amplitude which is adjustable) is less than or more than the constant amplitude along the line which contains the crankshaft.

The effectiveness of the walking bars 200 in removing fruit from the vines of any particular breed of tomato varies with the rotational speed of the crankshaft 202 as well as with its throw. The speed may be set to yield the optimum recovery of ripe fruit for any particular variety or size of vine and maintained at that speed, as will be shown later. For example, about 180 r.p.m. has worked well on some crops.

As shown in FIG. 1, the arms 209 and 210 extend downwardly and forwardly of the walking bars 200, thereby enabling the elevator or pickup unit 42 to deposit the tomatoes on the front end of the bars 200 at about the level of the end of the slide portions 141 of the strips 140. There is no movement of the walking bars 200 through the gaps between the strips 140 and hence no entanglement of the vine at this transfer point. The device smoothly transfers the tomatoes, and there is no opportunity for tomatoes to roll back to the ground once they have reached the slides 141, for even if the tomatoes come off the vine after that point, so long as they have been carried up to the slides 141, they will fall down between the walking bars 200 and be collected with the rest of the fruit that falls off at the shaker 43.

The shaker 43 separates the fruit from most of the vine, and the tomatoes fall down onto a conveyor 230 which is located just below the lowest points reached by the walking bars 200, a distance just sufficient to prevent the walking bars 200 from hitting any tomatoes resting on the conveyor 230. The short fall from the bars 200 to the conveyor 230 helps to prevent damage to the tomatoes. The forward end 231 of the conveyor 230 goes around a sprocket wheel 232 (FIG. 1) which lies forward of the forward end of the walking bars 200, the rear end of the slides 141, and the crankshaft 202, so that any tomatoes which reach the slide and fall between the bars 200 will fall onto the conveyor 230. Moreover, the conveyor 230 is enclosed within a forward wall 233, which keeps tomatoes from rolling off the lower end of the conveyor 230, and side walls 234 that also help to hold the fruit on the conveyor 230.

Details of a preferred form of the collecting conveyor 230 are shown in FIGS. 5–7. There are two chains 235, one on each side of the conveyor 230 running around and between the sprocket wheel 232 and a rear sprocket wheel 236. A shaft 237 may connect the forward sprocket wheels 232, and a shaft 238 may connect the rear sprocket wheels 236, or both chains may be driven individually. Cross members 240 are attached to the chains 235 by means of brackets 241. The cross members 240 are preferably flattened tubular members which are wider than they are high, and they are spaced apart a distance that is closer than the diameter of the minimum size of tomatoes to be caught but far enough to enable passage of dirt and various debris through the conveyor 230. The spacing also enables the conveyor 230 to catch the tomatoes in the spaces 242 between succeeding cross members 240 and carry them up that way. To some of the cross members 240 are affixed brackets 243 which support stub shafts 244 on which are mounted rotatable rollers 245. The rollers 245, which preferably are of nylon, roll on rails 246 and support the weight of the conveyor 230 and the tomatoes on it, while the chains 235 merely advance and move the conveyor and do not have to provide any support function.

The conveyor 230 moves rearwardly and upwardly on the upper run, as shown in FIGS. 7 and 1, on a gentle slant, so as to hold the tomatoes against downhill rolling. On the lower run, there is a portion 247 where the track 246 moves down and a gap between that and a portion 248 where it comes up, leaving an opening 249 between them. Here the conveyor 230 is slack and its path drops, as shown in FIG. 1, thereby providing an automatic takeup of the chains 235 as they wear.

The upper surface 201 of the walking bar 200 is important. Instead of providing finger-like projections that are quickly worn away and that tend to damage tomatoes, the invention provides an undulating wide upper surface 201 of rubber, which advances the vines upwardly, as they could not be advanced by smooth walking bars, but does so without damage to the tomatoes and with considerably less wear on the bar surfaces 201.

Thus, it will be seen that the shaker 43 serves to advance the tomato vines rearwardly of the machine while shaking off tomatoes in a gradually increasing order of severity. The tomatoes fall down between walking bars 200 into an area that is unencumbered by other parts and land on the conveyor 230. There are no places on the conveyor 230 or between the conveyor 230 and the walking bars 200 which could damage the tomatoes, because the crankshaft 202 lies beneath the conveyor 230, and the bars 200 themselves are joined to the crankshaft 202 by the bars 209 and 210 which extend forward of the conveyor 202 without touching it. At the rear end of the device, a cover plate 226 covers the box beam 215 and prevents entanglement of the vines in the rocking device.

The conveyor 230 moves the tomatoes rearwardly and upwardly and drops them onto a pair of transfer or cross conveyors 250 and 251 at the rear end of the shaker 43. The end of the conveyor 230 is spaced above the cross conveyors 250 and 251, although it somewhat overlaps them lengthwise. The conveyors 250 and 251 are slanted toward the front, that is, across their width, and are located closely adjacent to the slide 225, being joined to it by an upwardly extending slide portion 252.

The vertical gap 253 between the conveyor 230 and the cross conveyors 250 and 251 provides a space through which a strong current of air can be sent from a pair of blowers 254. The air coming from the blower is sent through nozzle-like outlets 225 at the gap 253 and passes through the stream of falling tomatoes as they drop from the conveyor 230 across the gap 253. The current of air is not sufficient to affect the tomatoes to any substantial degree, but it does pick up the lightweight particles of leaves and vines which have fallen down between the walking bars 200, have landed on the conveyor 230, and have not fallen out through the opening 242. The air current blows them up over the slide 252 onto the slide 225, whence they fall down with the vines and other particles that have been carried up over the fall off the rear end of the walking bars 200. The slide 225 is shielded somewhat by a shield 256 having side walls 257, a top wall 258, and a rear wall 259, and the shield 256 guides the current of air that passes from the blower 254 and through the gap 253. This helps to prevent any particles that fall from the ends 260 of the walking bars 200 from drifting back into the area over the conveyors 250 and 251 and falling on them. Also, the bars 200 have an upwardly slanted portion 261 carrying the vines above the current of air from the blower 254 onto terminal portions 262 extending out over the slide 225. Thus, the blower 254 keeps the area clear and also disposes of such debris as may remain on the conveyor 230 when it reaches the upper end of its run. The current of air is also effective even to pick up leaves and vine particles that have fallen onto the conveyors 250 and 251, although most of them never reach a quiescent state.

The blower 254 may be of the well-known vane type, in which there is an axial air inlet 263 and vanes 264 drive the air through a spiral path gradually increasing in diameter, by which the air passes to the outlet nozzle 255. The vanes 264 are driven by the engine 38.

In operation, the vines slide down the slide 141, which is purposely tilted at a steep angle to encourage them to slide, and if any tomatoes fall off at this point, they too roll down the slide 141 so that there is no problem in collecting them. The slide 141 overhangs the shaker unit 43 and deposits the vines on the walking bars 200 at approximately no change in elevation when they fall off. ("Approximately" means that the walking bars 200 are constantly moving up and down; it is not a transfer to a still object but to a moving one.) The tomatoes that have fallen off during their passage down the slide 141 fall directly between the bars 200 and if they should hit the upper surface 201 of one of the bars 200, they are not damaged because it is elastomeric and has no sharp angles. When the tomatoes fall down between the bars 200, they meet no obstruction, but land on the conveyor 230 a very short distance below the bars 200, without a severe drop. If they should tend to roll down and forward after falling between the walking bars 200, they are caught by the front wall 233 and start moving up the conveyor 230, taking a position in between succeeding pairs of cross members 240. Dirt which falls down also falls onto the conveyor 230 but generally falls between the members 240 at the spaces 242, and mainly, after passing through both runs of the conveyor 230, onto the ground over which the harvester is passing.

The walking bars 200, moved by their crankshaft 202 with the aid of the pitman 212, are set to translate according to the paths 222 at the forward end and 223 and 224 at the rear end. The tomatoes are therefore shaken off the vine with a gradually increasing action, and by the time they reach the end of the portions 201, the tomatoes have substantially all been shaken off the vine and have fallen onto the conveyor 230, as described. The absence of obstruction due to the positioning of the crankshaft 202 below the conveyor 230 and the use of the arms 209 and 210 to make this possible, the smooth transfer from the slide 141 to the bars 200 without any opportunity for the tomatoes to fall elsewhere than on the conveyor 230, all enhance operation at this point. The vines continue to move back, and having left all their tomatoes, move up the inclined portions 261 onto the terminal portions 262 and fall off the ends 260 and down onto the slide 225. From there, the vines drop out of the machine onto the ground, leaving each vine at approximately the same position where it was picked up.

The tomatoes are brought up the conveyor 230 along with some small leaves and plant bits, but almost all the dirt has already dropped off through the conveyor 230. As they reach the upper end of the conveyor 230, the tomatoes fall into the tilted rear cross conveyors 250 and 251 across the gap 253, while the blowers 254 send a strong current of air through them, carrying the plant debris, leaves, stems, and so on, up the slide 252 onto the slide 225. The blown current of air is guided by the shield structure 257 so that it goes down the slide and prevents any plant bits from drifting back onto the conveyors 251. The tomatoes, as they move out across the conveyors 250 and 251, are therefore substantially clean of plant debris.

The cross conveyors 250 and 251 then carry the tomatoes out to and deposit them gently on sorting conveyors.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a tomato harvesting machine, a shaker device, comprising
   a main frame,
   vertical forward and side walls supported by said frame,
   a crankshaft journaled on said main frame and extending laterally, near and to the rear of said forward wall, said crankshaft having at each end two cranks extending out at 180° intervals and synchronized with each other,
   two lateral base bars each joining a crank at one end to its synchronized crank at the other end,
   a third crank at one end of said crankshaft 90° out of phase with the other said cranks,
   a pitman journaled to a said third crank and extending rearwardly and upwardly, a box beam journaled to said side walls near the upper and rear end of said shaker device and extending across them laterally parallel to said crankshaft, and having a central pivot ear and two series of arms at one end, one arm extending rearwardly and another extending forwardly, in alternate order,
   a link having a length greater than said third crank pivotally connecting said box beam to said pitman, and
   a plurality of walking bars parallel to each other extending longitudinally and arranged alternately in two series,
   means connecting one end of one series to the first said base bar with link means pivotally connecting the other end of said one series to said forwardly extending arms and
   means connecting one end of the other series to the second said base bar with link means pivotally connecting the other end of said other series to said rearwardly extending arms.

2. The device of claim 1 in which each said walking bar has an elastomeric member providing an undulating upper surface for engaging said plants and aiding in advancing the plants along said bars.

3. In a tomato harvesting machine, a shaker device, comprising
   a main frame,
   vertical forward and side walls supported by said frame,
   a crankshaft journaled on said main frame and extending laterally, near and to the rear of said forward wall, said crankshaft having at each end two cranks extending out at 180° intervals and synchronized with each other,
   two lateral base bars each joining a crank at one end to its synchronized crank at the other end,
   a third crank at one end of said crankshaft 90° out of phase with the other said cranks,
   a pitman journaled to said third crank and extending rearwardly and upwardly,
   a box beam journaled to said side walls near the upper and rear end of said shaker device and extending across them laterally parallel to said crankshaft and having two series of arms, one arm extending rearwardly and another extending forwardly, in alternate order;
   a link having a length greater than said third crank pivotally connecting said pitman to said boxbeam,
   a plurality of walking bars parallel to each other extending longitudinally and arranged alternately in two series,
   means connecting one end of one series to the first said base bar with link means pivotally connecting the other end of said one series to said forwardly extending arms and means connecting one end of the other series to the second said base bar with link means pivotally connecting the other end of said other series to said rearwardly extending arms, and a conveyor supported by said main frame below the lowest point of travel of said walking bars and moving rearwardly and upwardly in its upper run, said conveyor having a forward end forward of said crankshaft and adjacent said forward wall, and a rear end, and lying above said crankshaft.

4. The device of claim 3 wherein said conveyor has parallel lateral members spaced from each other to provide a drop-out space for dirt and to provide tomato lodging pockets.

5. The device of claim 4 wherein at each end of some of said lateral members there is a rotatable roller and roller tracks on said main frame, for carrying the weight of said conveyor and its contents along said upper run.

6. The device of claim 3 having cover means across said box beam and at least one set of its arms for preventing entanglement of plants therewith.

7. The device of claim 1 having a conveyor supported by said main frame below the lowest point of travel of said walking bars and moving rearwardly and upwardly in its upper run, said conveyor having a forward end adjacent said forward wall, and a rear end;

cross-conveyor means supported by said main frame and extending laterally at the rear of said conveyor and spaced below it;

an air nozzle in the space between said conveyor and said cross-conveyor means; and blower means for sending a rearwardly and upwardly moving current of air through said nozzle.

8. The device of claim 7 in which said conveyor has parallel lateral members spaced from each other to provide a drop-out space for dirt and to provide tomato lodging pockets.

9. The device of claim 8 in which said conveyor has extensions on some of said lateral members and rollers on said extension, and a roller track for said rollers on said main frame, whereby said rollers carry the weight of said conveyor.

10. The device of claim 9 wherein the lower run of said conveyor has a gap in the roller track wide enough to enable the conveyor, by sagging, to automatically take up in length for wear.

References Cited by the Examiner
UNITED STATES PATENTS

| | | | |
|---|---|---|---|
| 447,433 | 3/1891 | Landis | 130—26 |
| 489,425 | 1/1893 | White | 130—26 |
| 926,201 | 6/1909 | Lytle | 130—21 |
| 976,306 | 11/1910 | Sipler | 130—26 |
| 1,715,218 | 5/1929 | Wright et al. | 130—30 |
| 1,975,668 | 10/1934 | Rodin | 171—14 |
| 2,369,723 | 2/1945 | Denlinger | 130—30 |
| 2,559,965 | 7/1951 | Innes | 130—30 |
| 2,633,685 | 4/1953 | Edwards | 130—30 |
| 3,070,944 | 1/1963 | Peto et al. | 56—327 |

ABRAHAM G. STONE, *Primary Examiner.*

JOE O. BOLT, JR., ANTONIO F. GUIDA, *Examiners.*